US008639616B1

(12) United States Patent
Rolenaitis et al.

(10) Patent No.: US 8,639,616 B1
(45) Date of Patent: Jan. 28, 2014

(54) BUSINESS TO CONTACT LINKAGE SYSTEM

(75) Inventors: Joni Rolenaitis, Costa Mesa, CA (US);
Alan Duckworth, Costa Mesa, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 137 days.

(21) Appl. No.: 13/250,851

(22) Filed: Sep. 30, 2011

Related U.S. Application Data

(60) Provisional application No. 61/388,969, filed on Oct. 1, 2010.

(51) Int. Cl.
*G06Q 40/00* (2012.01)

(52) U.S. Cl.
USPC .......................................................... 705/38

(58) Field of Classification Search
USPC .......................................................... 705/38
See application file for complete search history.

(56) References Cited

U.S. PATENT DOCUMENTS

| | | |
|---|---|---|
| 4,346,442 A | 8/1982 | Musmanno |
| 4,827,508 A | 5/1989 | Shear |
| 4,868,570 A | 9/1989 | Davis |
| 4,935,870 A | 6/1990 | Burk, Jr. et al. |
| 5,216,612 A | 6/1993 | Cornett et al. |
| 5,247,575 A | 9/1993 | Sprague et al. |
| 5,325,509 A | 6/1994 | Lautzenheiser |
| 5,341,429 A | 8/1994 | Stringer et al. |
| 5,528,701 A | 6/1996 | Aref |
| 5,555,409 A | 9/1996 | Leenstra, Sr. et al. |
| 5,590,038 A | 12/1996 | Pitroda |
| 5,621,201 A | 4/1997 | Langhans et al. |
| 5,630,070 A | 5/1997 | Dietrich et al. |
| 5,640,551 A | 6/1997 | Chu et al. |
| 5,640,577 A | 6/1997 | Scharmer |
| 5,655,129 A | 8/1997 | Ito |
| 5,659,731 A | 8/1997 | Gustafson |
| 5,666,528 A | 9/1997 | Thai |
| 5,692,107 A | 11/1997 | Simoudis et al. |
| 5,737,732 A | 4/1998 | Gibson et al. |
| 5,765,143 A | 6/1998 | Sheldon et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |
| 5,812,840 A | 9/1998 | Shwartz |
| 5,822,750 A | 10/1998 | Jou et al. |

(Continued)

FOREIGN PATENT DOCUMENTS

| | | |
|---|---|---|
| EP | 0 419 889 | 4/1991 |
| EP | 0 458 698 | 11/1991 |

(Continued)

OTHER PUBLICATIONS

Bitran et al., "Mailing Decisions in Catalog Sales Industry", Management Science (JSTOR), vol. 42, No. 9, Sep. 1996, pp. 1364-1381.

(Continued)

*Primary Examiner* — Clifford Madamba
(74) *Attorney, Agent, or Firm* — Knobbe Martens Olson & Bear LLP

(57) ABSTRACT

Systems and methods for capturing and maintaining business to contact links, where the links comprise a persistent and enduring association between business entities and individuals.

20 Claims, 8 Drawing Sheets

(56) References Cited

U.S. PATENT DOCUMENTS

| | | |
|---|---|---|
| 5,822,751 A | 10/1998 | Gray et al. |
| 5,825,884 A | 10/1998 | Zdepski et al. |
| 5,832,068 A | 11/1998 | Smith |
| 5,835,915 A | 11/1998 | Carr et al. |
| 5,844,218 A | 12/1998 | Kawan et al. |
| 5,881,131 A | 3/1999 | Farris et al. |
| 5,893,090 A | 4/1999 | Friedman et al. |
| 5,905,985 A | 5/1999 | Malloy et al. |
| 5,956,693 A | 9/1999 | Geerlings |
| 5,963,932 A | 10/1999 | Jakobsson et al. |
| 5,990,038 A | 11/1999 | Suga et al. |
| 6,038,551 A | 3/2000 | Barlow et al. |
| 6,070,147 A | 5/2000 | Harms et al. |
| 6,073,140 A | 6/2000 | Morgan et al. |
| 6,121,901 A | 9/2000 | Welch et al. |
| 6,128,602 A | 10/2000 | Northington et al. |
| 6,128,624 A | 10/2000 | Papierniak et al. |
| 6,144,957 A | 11/2000 | Cohen et al. |
| 6,151,601 A | 11/2000 | Papierniak et al. |
| 6,157,927 A | 12/2000 | Schaefer et al. |
| 6,223,171 B1 | 4/2001 | Chaudhuri et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,304,869 B1 | 10/2001 | Moore et al. |
| 6,321,205 B1 | 11/2001 | Eder |
| 6,339,769 B1 | 1/2002 | Cochrane et al. |
| 6,366,903 B1 | 4/2002 | Agrawal et al. |
| 6,393,406 B1 | 5/2002 | Eder |
| 6,405,173 B1 | 6/2002 | Honarvar |
| 6,424,878 B1 | 7/2002 | Barker et al. |
| 6,446,200 B1 | 9/2002 | Ball et al. |
| 6,457,012 B1 | 9/2002 | Jatkowski |
| 6,496,819 B1 | 12/2002 | Bello et al. |
| 6,505,168 B1 | 1/2003 | Rothman et al. |
| 6,523,022 B1 | 2/2003 | Hobbs |
| 6,523,041 B1 | 2/2003 | Morgan et al. |
| 6,574,623 B1 | 6/2003 | Leung et al. |
| 6,651,220 B1 | 11/2003 | Penteroudakis et al. |
| 6,738,748 B2 | 5/2004 | Wetzer |
| 6,748,426 B1 | 6/2004 | Shaffer et al. |
| 6,766,327 B2 | 7/2004 | Morgan, Jr. et al. |
| 6,804,346 B1 | 10/2004 | Mewhinney |
| 6,804,701 B2 | 10/2004 | Muret et al. |
| 6,850,895 B2 | 2/2005 | Brodersen et al. |
| 6,910,624 B1 | 6/2005 | Natsuno |
| 6,934,714 B2 | 8/2005 | Meinig |
| 6,954,757 B2 | 10/2005 | Zargham et al. |
| 6,983,379 B1 | 1/2006 | Spalink et al. |
| 6,983,478 B1 | 1/2006 | Grauch et al. |
| 6,985,887 B1 | 1/2006 | Sunstein et al. |
| 7,003,504 B1 | 2/2006 | Angus et al. |
| 7,028,001 B1 | 4/2006 | Muthuswamy et al. |
| 7,028,052 B2 | 4/2006 | Chapman et al. |
| 7,035,855 B1 | 4/2006 | Kilger et al. |
| 7,039,607 B2 | 5/2006 | Watarai et al. |
| 7,047,251 B2 | 5/2006 | Reed et al. |
| 7,050,989 B1 | 5/2006 | Hurt et al. |
| 7,065,566 B2 | 6/2006 | Menard et al. |
| 7,076,475 B2 | 7/2006 | Honarvar |
| 7,082,435 B1 | 7/2006 | Guzman et al. |
| 7,133,935 B2 | 11/2006 | Hedy |
| 7,184,974 B2 | 2/2007 | Shishido |
| 7,185,016 B1 | 2/2007 | Rasmussen |
| 7,188,169 B2 | 3/2007 | Buus et al. |
| 7,200,602 B2 | 4/2007 | Jonas |
| 7,240,059 B2 | 7/2007 | Bayliss et al. |
| 7,249,048 B1 | 7/2007 | O'Flaherty |
| 7,272,591 B1 | 9/2007 | Ghazal et al. |
| 7,277,900 B1 | 10/2007 | Ganesh et al. |
| 7,367,011 B2 | 4/2008 | Ramsey et al. |
| 7,370,044 B2 | 5/2008 | Mulhern et al. |
| 7,376,603 B1 | 5/2008 | Mayr et al. |
| 7,383,215 B1 | 6/2008 | Navarro et al. |
| 7,403,942 B1 | 7/2008 | Bayliss |
| 7,433,864 B2 | 10/2008 | Malik |
| 7,451,113 B1 | 11/2008 | Kasower |
| 7,467,127 B1 | 12/2008 | Baccash et al. |
| 7,475,118 B2 | 1/2009 | Leiba et al. |
| 7,483,842 B1 | 1/2009 | Fung et al. |
| 7,529,698 B2 | 5/2009 | Joao |
| 7,533,179 B2 | 5/2009 | Tarquini et al. |
| 7,536,346 B2 | 5/2009 | Aliffi et al. |
| 7,571,138 B2 | 8/2009 | Miri et al. |
| 7,596,512 B1 | 9/2009 | Raines et al. |
| 7,596,716 B2 | 9/2009 | Frost et al. |
| 7,647,344 B2 | 1/2010 | Skurtovich et al. |
| 7,668,840 B2 | 2/2010 | Bayliss et al. |
| 7,672,833 B2 | 3/2010 | Blume et al. |
| 7,672,924 B1 | 3/2010 | Scheurich et al. |
| 7,672,926 B2 | 3/2010 | Ghazal et al. |
| 7,689,505 B2 | 3/2010 | Kasower |
| 7,698,163 B2 | 4/2010 | Reed et al. |
| 7,707,059 B2 | 4/2010 | Reed et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,797,252 B2 | 9/2010 | Rosskamm et al. |
| 7,814,005 B2 | 10/2010 | Imrey et al. |
| 7,818,228 B1 | 10/2010 | Coulter |
| 7,912,865 B2 | 3/2011 | Akerman et al. |
| 7,930,195 B2 | 4/2011 | Heyns et al. |
| 7,983,932 B2 | 7/2011 | Kane |
| 7,991,901 B2 | 8/2011 | Tarquini et al. |
| 7,996,912 B2 | 8/2011 | Spalink et al. |
| 8,005,759 B2 | 8/2011 | Hirtenstein et al. |
| 8,024,264 B2 | 9/2011 | Chaudhuri et al. |
| 8,099,341 B2 | 1/2012 | Varghese |
| 8,127,986 B1 | 3/2012 | Taylor et al. |
| 8,271,378 B2 | 9/2012 | Chaudhuri et al. |
| 8,285,656 B1 | 10/2012 | Chang et al. |
| 8,312,033 B1 | 11/2012 | McMillan |
| 8,321,952 B2 | 11/2012 | Spalink et al. |
| 8,392,334 B2 | 3/2013 | Hirtenstein et al. |
| 8,463,919 B2 | 6/2013 | Tarquini et al. |
| 2001/0011245 A1 | 8/2001 | Duhon |
| 2001/0037332 A1 | 11/2001 | Miller et al. |
| 2002/0026507 A1 | 2/2002 | Sears et al. |
| 2002/0049738 A1 | 4/2002 | Epstein |
| 2002/0069122 A1 | 6/2002 | Yun et al. |
| 2002/0099628 A1 | 7/2002 | Takaoka et al. |
| 2002/0099824 A1 | 7/2002 | Bender et al. |
| 2002/0103809 A1 | 8/2002 | Starzl et al. |
| 2002/0128962 A1 | 9/2002 | Kasower |
| 2002/0133504 A1 | 9/2002 | Vlahos et al. |
| 2002/0138297 A1 | 9/2002 | Lee |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0173984 A1 | 11/2002 | Robertson et al. |
| 2002/0184255 A1 | 12/2002 | Edd et al. |
| 2002/0188544 A1 | 12/2002 | Wizon et al. |
| 2002/0198824 A1 | 12/2002 | Cook |
| 2003/0009418 A1 | 1/2003 | Green et al. |
| 2003/0018549 A1 | 1/2003 | Fei et al. |
| 2003/0018578 A1 | 1/2003 | Schultz |
| 2003/0050882 A1 | 3/2003 | Degen et al. |
| 2003/0097380 A1 | 5/2003 | Mulhern et al. |
| 2003/0101344 A1 | 5/2003 | Wheeler et al. |
| 2003/0105728 A1 | 6/2003 | Yano et al. |
| 2003/0171942 A1 | 9/2003 | Gaito |
| 2003/0191731 A1 | 10/2003 | Stewart et al. |
| 2003/0212654 A1 | 11/2003 | Harper et al. |
| 2003/0229892 A1 | 12/2003 | Sardera |
| 2004/0010458 A1 | 1/2004 | Friedman |
| 2004/0098625 A1 | 5/2004 | Lagadec et al. |
| 2004/0103147 A1 | 5/2004 | Flesher et al. |
| 2004/0111359 A1 | 6/2004 | Hudock |
| 2004/0117358 A1 | 6/2004 | Von Kaenel et al. |
| 2004/0128150 A1 | 7/2004 | Lundegren |
| 2004/0153330 A1 | 8/2004 | Miller et al. |
| 2004/0153448 A1 | 8/2004 | Cheng et al. |

(56) References Cited

U.S. PATENT DOCUMENTS

| | | |
|---|---|---|
| 2004/0199456 A1 | 10/2004 | Flint et al. |
| 2004/0199789 A1 | 10/2004 | Shaw et al. |
| 2004/0220896 A1 | 11/2004 | Finlay et al. |
| 2004/0225594 A1 | 11/2004 | Nolan, III et al. |
| 2004/0225596 A1 | 11/2004 | Kemper et al. |
| 2004/0243588 A1 | 12/2004 | Tanner et al. |
| 2005/0010513 A1 | 1/2005 | Duckworth et al. |
| 2005/0137899 A1 | 6/2005 | Davies et al. |
| 2005/0154664 A1 | 7/2005 | Guy et al. |
| 2005/0177397 A1 | 8/2005 | Kane |
| 2005/0192008 A1 | 9/2005 | Desai et al. |
| 2005/0262158 A1 | 11/2005 | Sauermann |
| 2005/0288998 A1 | 12/2005 | Verma et al. |
| 2006/0020611 A1 | 1/2006 | Gilbert et al. |
| 2006/0036543 A1 | 2/2006 | Blagg et al. |
| 2006/0074991 A1 | 4/2006 | Lussier et al. |
| 2006/0149674 A1 | 7/2006 | Cook et al. |
| 2006/0184585 A1 | 8/2006 | Grear et al. |
| 2006/0195688 A1 | 8/2006 | Drissi et al. |
| 2006/0229799 A1 | 10/2006 | Nimmo et al. |
| 2006/0229943 A1 | 10/2006 | Mathias et al. |
| 2006/0242047 A1 | 10/2006 | Haggerty et al. |
| 2006/0271472 A1 | 11/2006 | Cagan |
| 2006/0282359 A1 | 12/2006 | Nobili et al. |
| 2007/0067437 A1 | 3/2007 | Sindambiwe |
| 2007/0118393 A1 | 5/2007 | Rosen et al. |
| 2007/0156554 A1 | 7/2007 | Nikoley et al. |
| 2007/0220611 A1 | 9/2007 | Socolow et al. |
| 2007/0226093 A1 | 9/2007 | Chan et al. |
| 2007/0282730 A1 | 12/2007 | Carpenter et al. |
| 2007/0282736 A1 | 12/2007 | Conlin et al. |
| 2007/0299759 A1 | 12/2007 | Kelly |
| 2008/0059224 A1 | 3/2008 | Schechter |
| 2008/0059449 A1 | 3/2008 | Webster et al. |
| 2008/0095441 A1 | 4/2008 | Rosskamm et al. |
| 2008/0109444 A1 | 5/2008 | Williams et al. |
| 2008/0183504 A1 | 7/2008 | Highley |
| 2008/0301016 A1 | 12/2008 | Durvasula et al. |
| 2009/0018996 A1 | 1/2009 | Hunt et al. |
| 2009/0024428 A1* | 1/2009 | Hudock, Jr. ................... 705/7 |
| 2009/0048877 A1 | 2/2009 | Binns et al. |
| 2009/0060343 A1 | 3/2009 | Rosca |
| 2009/0112650 A1 | 4/2009 | Iwane |
| 2009/0228918 A1 | 9/2009 | Rolff et al. |
| 2009/0234665 A1 | 9/2009 | Conkel |
| 2010/0094758 A1 | 4/2010 | Chamberlain et al. |
| 2010/0145840 A1 | 6/2010 | Kasower |
| 2010/0169159 A1 | 7/2010 | Rose et al. |
| 2010/0185546 A1 | 7/2010 | Pollard |
| 2010/0250411 A1 | 9/2010 | Ogrodski |
| 2010/0250497 A1 | 9/2010 | Redlich et al. |
| 2011/0016042 A1 | 1/2011 | Cho et al. |
| 2011/0060905 A1 | 3/2011 | Stack et al. |
| 2011/0137760 A1 | 6/2011 | Rudie et al. |
| 2011/0164746 A1 | 7/2011 | Nice et al. |
| 2011/0184838 A1 | 7/2011 | Winters et al. |
| 2011/0219421 A1 | 9/2011 | Ullman et al. |
| 2012/0072464 A1* | 3/2012 | Cohen ......................... 707/803 |
| 2012/0265607 A1 | 10/2012 | Belwadi |
| 2013/0124392 A1 | 5/2013 | Achanta et al. |
| 2013/0173481 A1 | 7/2013 | Hirtenstein et al. |

FOREIGN PATENT DOCUMENTS

| | | |
|---|---|---|
| EP | 0 559 358 | 9/1993 |
| EP | 0 977 128 | 2/2000 |
| EP | 0 772 836 B1 | 12/2001 |
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2004-0078798 | 9/2004 |
| WO | WO 95/034155 | 12/1995 |
| WO | WO 96/000945 | 1/1996 |
| WO | WO 98/041931 | 9/1998 |
| WO | WO 98/041932 | 9/1998 |
| WO | WO 98/041933 | 9/1998 |
| WO | WO 99/017225 | 4/1999 |
| WO | WO 99/017226 | 4/1999 |
| WO | WO 99/038094 | 7/1999 |
| WO | WO 00/004465 | 1/2000 |
| WO | WO 00/028441 | 5/2000 |
| WO | WO 01/084281 | 11/2001 |
| WO | WO 2004/114160 | 12/2004 |
| WO | WO 2008/022289 | 2/2008 |
| WO | WO 2008/054403 | 5/2008 |
| WO | WO 2009/117518 | 9/2009 |
| WO | WO 2010/132492 | 11/2010 |
| WO | WO 2013/009920 | 1/2013 |

OTHER PUBLICATIONS

Elmasri et al., "Fundamentals of Database Systems, Third Edition (Excerpts)," Jun. 2000, pp. 253, 261, 268-270, 278-280, 585, 595.

Ettore, Paul Kahn on Exceptional Marketing. Management Review, vol. 38(11), Nov. 1994, pp. 48-51.

Ideon, Credit-Card Registry that Bellyflopped this Year, Is Drawing some Bottom-Fishers, The Wall Street Journal, Aug. 21, 1995, pp. C2.

Klein, et al., "A Constant-Utility Index of the Cost of Living", The Review of Economic Studies, pp. 84-87, vol. XV-XVI, Kraus Reprint Corporation, New York, 1960.

Klein, et al., "An Econometric Model of the United States: 1929-1952", Amsterdam: North-Holland, 1955.

Klein, L.R; "The Keynesian Revolution", New York: MacMillan, 1947.

Loshin, Intelligent Enterprise: Better Insight for Business Decisions, "Value-Added Data: Merge Ahead", Feb. 9, 2000, vol. 3, No. 3, 5 pages.

Miller, Joe, "NADA used-car prices go online". Automotive News, Jun. 14, 1999, p. 36.

Sawyers, Arlena "NADA to offer residual guide". Automotive News, May 22, 2000, p. 3.

Sax, Michael M., Data Collection and Privacy Protection: An International Perspective, Presentation: Managing Online Risk and Liability Conference, Aug. 31, 1999, pp. 58 pages.

Smith, Wendell R., "Product Differentiation and Market Segmentation as Alternative Marketing Strategies", The Journal of Marketing, Jul. 1956, pp. 3-8, vol. XXI, The American Marketing Association, Brattleboro, Vermont, U.S.A.

Stone, "Linear Expenditure Systems and Demand Analysis: An Application to the Pattern of British Demand", The Economic Journal: The Journal of the Royal Economic Society, pp. 511-527, vol. LXIV, Macmillan & Co., London, Sep. 1954.

Tao, Lixin; "Shifting Paradigms with the Application Service Provider Model"; Concordia University, Canada; IEEE; Oct. 2001.

Various Posts from the <p2p.wrox.com> Forums: http://web.archive.org/web/2005045221950/http://p2p.wrox.com/topic.asp?TOPIC_ID=6513, dated Nov. 15, 2003-Oct. 7, 2004.

Web Page posted at: http://web.archive.org/web20040805124909/http://www.oracle.com/technology/sample_codete/tech/pl_sql/htdocs/x/Case/start.htm, pp. 1 and 4 of the webs page posted on Jan. 7, 2003.

Working, Holbrook, "Statistical Laws of Family Expenditure", Journal of the American Statistical Association, pp. 43-56, vol. 38, American Statistical Association, Washington, D.C., Mar. 1943.

(56) References Cited

OTHER PUBLICATIONS

U.S. Appl. No. 12/705,489, filed Feb. 12, 2010, Bargoli et al.
U.S. Appl. No. 12/705,511, filed Feb. 12, 2010, Bargoli et al.
Cohen et al., "Optimizer: IBM's Multi Echelon Inventory System for Managing Service Logistics", Interfaces, vol. 20, pp. 65-82, Jan.-Feb. 1990.
"D&B Corporate Family Linkage", D&B Internet Access for U.S. Contract Customers, https://www.dnb.com/ecomp/help/linkage.htm as printed Dec. 17, 2009, pp. 1.
"Debt Settlement: Watch Video on how to Pay Your Debt Faster", http://www.debtconsolidationcare.com/debt-settlement.html printed Jan. 9, 2013 in 6 pages.
"Ficticious Business Name Records", Westlaw Database Directory, http://www.directoy.westlaw.com/scope/default.asp?db=FBN-ALL& RS-W&VR=2.0 as printed Dec. 17, 2009, pp. 5.
Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.
Handfield, Robert B. et al., "Managing Component Life Cycles in Dynamic Technological Environments", International Journal of Purchasing and Materials Management, Tempe, vol. 30, Iss. 2, p. 20, 9 pgs., Spring 1994, ProQuest ID 590096.
Inderfurth et al., "Decision Support for Spare Parts Acquisition in Post Product Life Cycle", Central European Journal of Operations Research, vol. 16, pp. 17-42, 2008 [Initially published online Dec. 21, 2007].
"Japan's JAAI system appraises used cars over internet", Asia Pulse, Mar. 3, 2000.
Käki, Anssi, "Forecasting in End-Of-Life Spare Parts Procurement", Master's Thesis—Helsinki University of Technology System Analysis Laboratory, Jul. 27, 2007.
Kim, Bowon et al., Optimal Pricing, EOL (End of Life) Warranty, and Spare Parts Manufacturing Strategy Amid Product Transition, European Journal of Operation Research, vol. 188, pp. 723-745, 2008 [Initially published online May 1, 2007].
Krupp, James A.G.; "Forecasting for the Automotive Aftermarket"; The Journal of Business Forecasting Methods & Systems; Winter 1993-1994; 12, 4; ABI/Inform Global; pp. 8-12.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lapide, Larry, "New Developments in Business Forecasting", The Journal of Business Forecasting, pp. 12-14, Spring 2002.
Moore, John R., Jr. "Forecasting and Scheduling for Past-Model Replacement Parts" Management Science, Application Series, vol. 18, No. 4, Part 1, Dec. 1971, pp. B200-B213.
"Name Availability Records", Westlaw Database Directory, http://directoy.westlaw.com/scope/default.asp?db=NA-ALL&RS=W&VR=2.0 as printed Dec. 17, 2009, pp. 5.
Packer, A. H., "Simulation and Adaptive Forecasting an Applied to Inventory Control", Operations Research, vol. 15, No. 4, pp. 660-679, Jul. 1965.
Peters, Peter-Paul, "A Spare Parts Configurator for the European Service Business" (Graduation Report); Honeywell, Industrial Service Logistic Center; Amsterdam, The Netherlands; 80 Pgs.; Mar. 2000.
Porter, G. Zell, "An Economic Method for Evaluating Electronic Component Obsolescence Solutions", Retrieved from the web at www.gidep.org/data/dmsms/library/zell.pdf, May 1998, pp. 1-9.
"PremierGuide Announces Release 3.0 of Local Search Platform", Business Wire, Mar. 4, 2004, Palo Alto, CA, p. 5574.
"Qualifying for Debt Settlement", http://www.certifieddebt.com/debt/settlement-qualifications.shtml printed Jan. 9, 2013 in 2 pages.
"Resolve Debt for Less: With Help from Freedom Financial" http://www.debtsettlementusa.com/ printed Jan. 9, 2013 in 6 pages.
Roos, Gina, "Web-Based Service Helps OEMs Cure Parts Obsolescence Blues", Electronic Engineering Times, p. 86, Oct. 8, 2001, Dialog 09056737 78968668.
Santarini, Michael, "Forecasts the Probably Obsolescence of Components—Module Predicts Parts Life", Electronic Engineering Times, Jan. 11, 1999, p. 48(1), Dialog 0607160353548246.
"Settling Your Debts—Part 1 in Our Debt Settlement Series", http://www.creditinfocenter.com/debt/settle_debts.shtml printed Jan. 9, 2013 in 6 pages.
Sullivan, Laurie, "Obsolete-Parts Program Thriving", EBN, Manhasset, Issue 1296, p. 26, Jan. 2002, ProQuest 10 101195090.
"WashingtonPost.com and Cars.com launch comprehensive automotive web site for the Washington area", PR Newswire, Oct. 22, 1998.
Webster, Lee R., "Failure Rates & Life Cycle Costs", Consulting-Specifying Engineer; 23, 4; ABI/INFORM Global, Apr. 1998, p. 42.
International Search Report and Written Opinion for Application No. PCT/US2012/046316, dated Sep. 28, 2012.
International Search Report and Written Opinion for Application No. PCT/US09/60393, dated Dec. 23, 2009.
International Search Report and Written Opinion for Application No. PCT/US09/37565, dated May 12, 2009.
International Search Report and Written Opinion for Application No. PCT/US10/34434, dated Jun. 23, 2010.

* cited by examiner

202

| BIN: | 123456789 |
|---|---|
| Legal name: | J.S., Inc |
| DBA Name: | John's Bike Shop |
| Address: | 123 Main Street, Dallas, TX |
| Phone: | 972.555.1200 |
| Owner: | John Smith |
| Industry Code: | 5941 |
| Annual Sales: | $3,500,000 |
| Number of Employees: | 3 |
| High Credit: | $18,000 |
| | $32,000 |

| BIN | 123456789 | | | | | | | | | |
|---|---|---|---|---|---|---|---|---|---|---|
| Name | Street | City | State | Phone | Ind Code | Ann Sales | Employees | Owner | High Credit |
| John's Bike Shop | 123 Main | Dallas | TX | 972.555.1200 | 5945 | 3,500,000 | 3 | John Smith | 18,000 |
| J.S., Inc. | 123 Main, #1 | Dallas | TX | 972.555.1200 | 5941 | | | 3 John Smith | |
| John's Bikes | Main and First | Dallas | TX | | 5941 | | | John Smith | |
| John's Bike Shop | 123 Main Street | Dallas | TX | 972.555.1200 | | 1000 | 200 | | 32000 |

Sources

Figure 2

Consumer Highlights 700

Business Principal Names:

| | |
|---|---|
| JOHN CONSUMER | YOB: 1954<br>Age: 57 |
| JOHN P. CONSUMER JR. | |
| JOHN PHILLIP CONSUMER | |

Principal Addresses

| | |
|---|---|
| 475 ANTON BLVD<br>COSTA MESA, CA 94626-7037 | Reported: 07/2011 |
| 100 MAIN STREET<br>PHOENIX, AZ 85016-7890 | Reported: 05/2011 |
| 102 MAIN STREET<br>PHOENIX, AZ 85016-7892 | Reported: 02/2011 |

Owner Current and Former Business Affiliations 710

| Business Name | SIC Code | Affiliation Title 712 | Affiliation Dates | Link Confidence 711 |
|---|---|---|---|---|
| ✓ POCKET PROTECTOR, LLC | 8711 – Engineering Job Shops | OFFICER | 09/15/1999 – Present | High |
| ✓ ACME TRUCKING | 4212 – Trucking Without Storage, Local | CO-OWNER | 07/01/2010 – Present | High |
| ✓ DIE AND MOLD | 3544 – Special Dies, Tools, Die Set/Jigs/Mold | PARTNER | 06/11/2008 – Present | High |
| FABRICATING AND FINISHING INC | 3029 – Plastics-Fabricating/Finish/Decor-Mfrs | PRESIDENT | 07/11/2010 – 12/01/2010 | High |
| KLASSY FINISHES | 5231 – Paint, Glass & Wallpaper Stores | OFFICER | 10/11/2009 – 10/12/2010 | High |
| COUNTER TOP EMPORIUM | 5712 – Counter Tops | UCC DEBTOR | 05/17/2008 – 10/09/2010 | High |

✓ indicates current affiliate. Others are former affiliates

Figure 7

| # | Business Name | EIN | Years on File | Current Balance | Recent High Credit | Credit Score* | DBT |
|---|---|---|---|---|---|---|---|
| 1 | POCKET PROTECTOR, LLC | 700341221 | 26 | $576 | $500 | 2 - High Risk | 105 |
|   | Address 100 MAIN ST, PHOENIX, AZ 85016 (602)999-9999 | | | | | | |
| 2 | ACME TRUCKING | 700012406 | 23 | $22,639 | $27,900 | 11 - Medium-High Risk | 1 |
|   | Address 123 BLACKTOP LANE, NEWPORT BEACH, CA 92626 (714)999-9999 | | | | | | |
| 3 | DIE AND MOLD | 700980433 | 32 | $1,771 | $9,600 | 7 - High Risk | 35 |
|   | Address 666 INDUSTRIAL PARKWAY, COSTA MESA, CA 92626 (714)811-1111 | | | | | | |
|   | Average Values | | | | | | 47 |
|   | Current Total Exposure | | | $8,329 | $12,700 | 7 - High Risk | |
|   | Total Potential Exposure | | | $24,986 | $38,100 | | |

Column callouts: 810 (Current Balance), 820 (Recent High Credit), 830 (Credit Score), 840 (DBT)

Figure 8

BUSINESS TO CONTACT LINKAGE SYSTEM

CROSS-REFERENCE TO RELATED APPLICATION

This application claims the benefit of priority under 35 U.S.C. §119(e) of U.S. Provisional Application No. 61/388,969, filed Oct. 1, 2010 and titled BUSINESS TO CONTACT LINKAGE SYSTEM, the disclosure of which is hereby incorporated by reference in its entirety into this application.

BACKGROUND

Various financial service providers extend credit services to individuals and businesses. In their investigation associated with such transactions, the financial service providers may wish to receive financial data related to credit activities, current assets, and current liabilities of the individual, as well as the financial health of the businesses associated with the individual. Commonly, this association of businesses to an individual may be determined by the financial service provider wishing to receive the financial information, and may be generally based on input from the individual applying to receive the credit services.

SUMMARY OF THE DISCLOSURE

Embodiments of the invention are directed to systems and methods for capturing and maintaining business to contact links, where the links comprise a persistent and enduring association between business entities and individuals.

BRIEF DESCRIPTION OF THE DRAWINGS

Specific embodiments of the invention will now be described with reference to the following drawings, which are intended to illustrate embodiments of the invention, but not limit the invention:

FIG. 2 is a sample user interface that shows the result of reconciliation of records in accordance with one embodiment;

FIG. 7 is a sample report showing current and historical businesses associated with an individual according to one embodiment;

FIG. 8 is a sample report showing some commercial credit metrics for current businesses linked to an individual.

DETAILED DESCRIPTION OF PREFERRED EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The business to contact (B2C) linkage system described is designed to build a repository of B2C links, implement data management processes for the ongoing capture and maintenance of the links, and provide for the delivery of products that use the B2C links. The B2C links are a persistent and enduring association between individual information and business information, both of which may be separately stored in the overall B2C linkage system. In the following, individual information is referred to as having associated with it a personal identification number (PIN), and business information is referred to as having associated with it a business identification number (BIN). However, references to these information and identification numbers should be interpreted to include any other like data assets and/or identification numbers.

Example System Implementation

Figure 1:
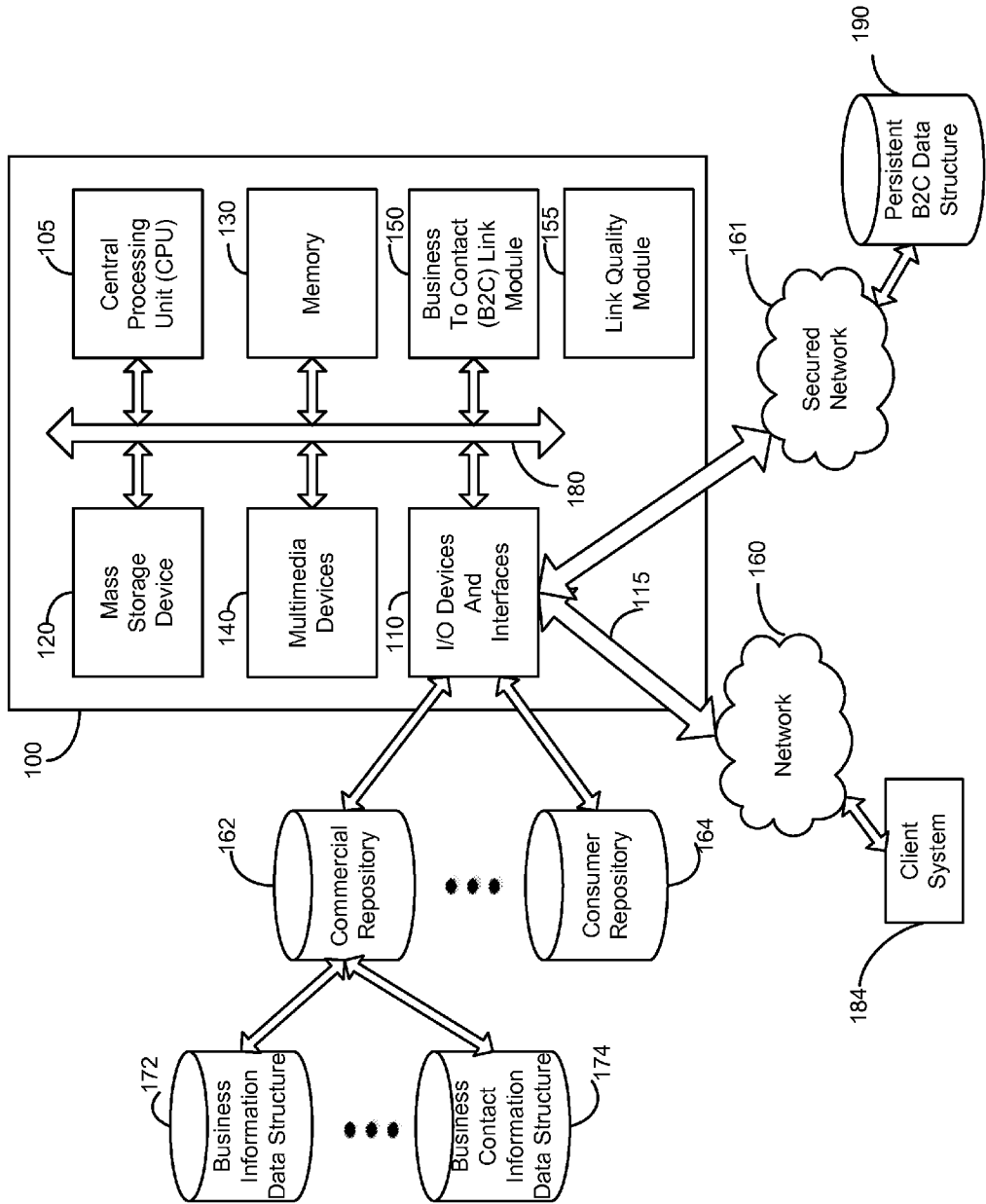
FIG. 1 is a block diagram of a computing system for capturing, maintaining, qualifying and delivering business to contact links according to one embodiment.

FIG. 1 is a block diagram showing an embodiment in which a computing system 100 is in communication with a network 160 and various systems are also in communication with the network 160. The computing system 100 may be used to implement systems and methods described herein. For example, the computing system 100 may be a business to contact (B2C) linkage system configured to provide an interface for financial service providers, or other entities interested in association between consumers and businesses (e.g., companies that are considering extending credit services to individuals and businesses), which are referred to herein individually or collectively as "requesting entities". Although the description provided herein refers to individuals, consumers, or customers, the terms "user," "individual," "consumer," and "customer" should be interpreted to include groups of individuals, such as, for example, married couples or domestic partners, organizations, groups, and business entities.

The computing system 100 includes, for example, a personal computer that is IBM, Macintosh, or Linux/Unix compatible or a server or workstation. In one embodiment, the computing system 100 comprises a server, a laptop computer, a cell phone, a personal digital assistant, a kiosk, or an audio player, for example. In one embodiment, the exemplary computing system 100 includes one or more central processing unit ("CPU") 105, which may each include a conventional or proprietary microprocessor. The computing system 100 further includes one or more memory 130, such as random access memory ("RAM") for temporary storage of information, one or more read only memory ("ROM") for permanent storage of information, and one or more mass storage device 120, such as a hard drive, diskette, solid state drive, or optical media storage device. Typically, the modules of the computing system 100 are connected using a standard based bus system 180. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows XP, Windows Vista, Windows 7, Windows Server, Unix, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1, the computing system 100 is electronically coupled to a network 160, which comprises one or more networks, such as one or more of a LAN, WAN, and/or the Internet, for example, via a wired, wireless, or combination of wired and wireless, communication link 115. The network 160 communicates with various computing devices and/or other electronic devices via wired or wireless communication links.

According to FIG. 1, information is provided to the computing system 100 over the network 160 from one or more data sources including, for example, commercial repository 162, consumer repository 164. The information supplied by the various data sources may include credit data, demographic data, application information, product terms, accounts receivable data, financial statements, and/or other like data, for example. Such information may be provided to the commercial repository 162 and consumer repository 164 by other data structures such as a business information data structure 172, business contact information data structure 174, and the like. In one embodiment, the business information data structure 172 and the business contact information data structure 174 comprise data obtained from several other data structures, such as, for example, corporate record filings data structure, fictitious business name filings data structure, business license filings data structure, UCC filings data structure, judgments data structure, tax liens data structure, bankruptcies data structure, sales tax filings data structure. In some embodiments, records from the various source data structures may comprise different or additional data fields from one another. A skilled artisan will understand that the processes described herein may be modified to accommodate different forms of records. Some or all of these data sources may also be segmented to distinguish business information and business contact information. In one embodiment the consumer repository 164 comprises data obtained from a credit data structure and a consumer marketing data structure. Consumer credit and consumer marketing data may be handled differently, and the links identified according to the processes described herein may be divided along this boundary as well.

In addition to the devices that are illustrated in FIG. 1, the network 160 may communicate with other data sources or other computing devices. In addition, the data sources may include one or more internal and/or external data sources. In some embodiments, one or more of the data structures or data sources may be implemented using a relational database, such as Sybase, Oracle, CodeBase and Microsoft® SQL Server as well as other types of data structures such as, for example, a flat file data structure, an entity-relationship data structure, an object-oriented data structure, and/or a record-based data structure.

A client system 184 may be connected to the network 160 and used by a requesting entity to exchange information with the computing system 100. For example, the client system 184 may be used to transmit information related to an individual or business requesting a credit service, and the computing system 100 may respond to the information received from the client system 184 by providing a report for display to the requesting entity using the client system 184 to facilitate the decision of the requesting entity on whether to extend credit to the individual or business. The client system 184 may be a desktop computer, a mobile computer, or any other mobile device such as a mobile phone or other similar handheld computing devices. The client system 184 may include the same or similar components to those discussed above with reference to the computing system 100.

In one embodiment, the I/O devices and interfaces 110 further provide a communication interface to an internal persistent business to contact (B2C) data structure 190. In the embodiment of FIG. 1, the computing system 100 is coupled to a secured network 161, such as a secured LAN, for example. The system communicates with the persistent B2C data structure 190 through the secured network 161. In some embodiments, the persistent B2C data structure 190 is configured to communicate with additional computing devices over the network 160 or some other network, such as a LAN, WAN, or the Internet via a wired, wireless, or combination of wired and wireless, communication link.

In the embodiment of FIG. 1, the computing system 100 also includes a business to contact (B2C) link module 150 and a link quality module 155 that may be stored in the mass storage device 120 as executable software codes that are executed by the CPU 105. In the embodiment shown in FIG. 1, the computing system 100 is configured to execute the B2C link module 150 and the link quality module 155 among others, in order to handle various aspects for providing requesting entities with information to determine whether to extend credit services to individuals and/or businesses.

In general, the word "module," as used herein, refers to logic embodied in hardware or firmware, or to a collection of software instructions, possibly having entry and exit points, written in a programming language, such as, for example, Java, Lua, C or C++. These modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

FIG. 2 is a sample user interface that may be provided to a requesting entity. The user interface 202 may be provided to a requesting entity (e.g., a company that requests information regarding business associations of an individual, John Smith) to indicate results of reconciliation of records by the computing system 100, in accordance with one embodiment. A process may be performed on records in the commercial repository 162 in order to associate a single BIN with a single business. Those records that are determined to be multiple business records may be stored. Records that are determined to be multiple records corresponding to a single business, may also be stored, but are appended with a flag indicating the basis for determining that the records correspond to a single business.

Businesses having multiple records that are actually a single business may correspond to, for example, a single business stored with slight variations in name or address, or with conflicting information regarding an attribute such as for example industry code, annual sales, number of employees, the maximum credit to offer, and the like. For example, as illustrated in FIG. 2, a single business John's Bike Shop may exist, and four records may be present in the commercial repository 162 corresponding to this single business. Despite the variations in the records' name, address, annual sales figures, number of employees and maximum credit amount, the four records are associated with a single business by the B2C linkage system 100 through proper filtering.

The filtering may be done as follows. A BIN is selected and all of the records related to that BIN are accessed from commercial repository 162. The records corresponding to each of the BINs may be processed iteratively or in parallel according to different embodiments.

In one embodiment, it is determined whether any of the selected records having the same BIN have matching business names. If the records do have matching business names then the records correspond to a single business and the non-matching records are dropped. The business name fields in records being compared are not required to be identical in order to be considered matching names. A rule set may be applied to determine a similarity level or to determine if they meet predetermined criteria and are considered to be matching. For example, a rule set may indicate that when at least 50% (or some other portion) of the words in the names are identical, then the names match. Certain words and characters may be filtered out of this determination. For example, common words and literals such as 'AND', 'DDS', 'MD', '&', 'ASSOC', 'ASSOCS', 'AT', 'LAW' may be removed from consideration in the name matching process. Corporate literals such as 'LLP', 'LLC', 'CORP', and 'INC' may also be removed from the name matching process.

In some embodiments, multiple records may be indirectly matched. For example, if a first record 'A' is matched to a second record 'B' but not to a third record 'C', but the record 'B' is matched to the record 'C', then 'A' may be indirectly matched to 'C' as well. Other rule sets may be used to determine whether business names match.

While in some embodiments the non-matching records may be dropped or kept, in some embodiments all of the records are stored in the commercial repository 162, but 'dropped' records are flagged with an exception. The exception flag may identify why the record is not a multiple-business record. For example, records that have matching business names may be flagged indicating that they have matching business names. Thus, these records would still be available but would not be identified as a multiple business record. One of the flagged records may be selected to represent the single business having multiple records.

If the records do not have matching business names, additional rules may be applied to determine whether or not records associated with a single ownership entity are multiple-business records. For example, it is determined whether there are at least two fields having different values, selected from all fields. The fields may be, for example the address, the phone number, the industry code, the annual sales, the number of employees, the name of the owner, the maximum amount of credit. Of course, other fields or a different number of fields may be used, and additional or alternative rules may be applied. In the embodiment shown, if two of the selected fields do not match, then the records are kept as multiple business records stored in commercial repository 162. If there are not at least two different fields from these selected fields, then the process drops (flags and stores) the records. Thus, false positives (different BINs representing one business) are dropped from the commercial repository 162, allowing for a more accurate determination of multiple-business owner data.

The B2C link module 150 and the link quality module 155 illustrated in FIG. 1 are used to implement a B2C linkage system and method of linking business principals to their current and previous businesses. The B2C linkage system 100 can link hundreds of thousands of individual and business name and address variations, and can also designate a level of strength with each of the B2C links created. The links between individuals and businesses can be established based on source data, and can be maintained over time with a link confidence indication based on updates from public records, trades, and other sources. The B2C link itself may be a simple structure containing only the primary identity keys from the source systems concatenated to form a logical pair, a confidence indicator and a few attributes that describe how the link was formed. In one embodiment, all identifying attributes (name, address, etc.) remain in the source systems and do not reside in the B2C data structure.

In one embodiment, a requesting entity may input an individual applicant's information, including the individual's name and address, and the B2C linkage system 100 may link the individual's PIN with one more currently and previously affiliated BINs. By acknowledging the individual that is common between the consumer and business data structures, the individual's identity is used to link the information from the different sources. The B2C link captures associations between the consumer source system and business source system data assets that pivot around a central entity: the individual.

After the links are identified, the system may return the links to the requesting entity, with or without an indication of the confidence or strength of the links. The system may also return the business title of the individual for each linked business located, and/or commercial credit attributes for each business linked. The B2C linkage system may also provide audit and integrity information describing the creation and historical use of the B2C links as well as providing a means of defining and maintaining the rules that govern the management and delivery of the B2C links. The B2C links, when accessed at product delivery time, provide a means to share and exchange information across business processes by acting as a directory to traverse between sources and providing the system keys by which the product request can subsequently access the authorized content within those source domains. The B2C Linkage data structure may be physically separate and distinct from the source systems that contain the identity attributes necessary for comparison, matching and linking.

Figure 3:
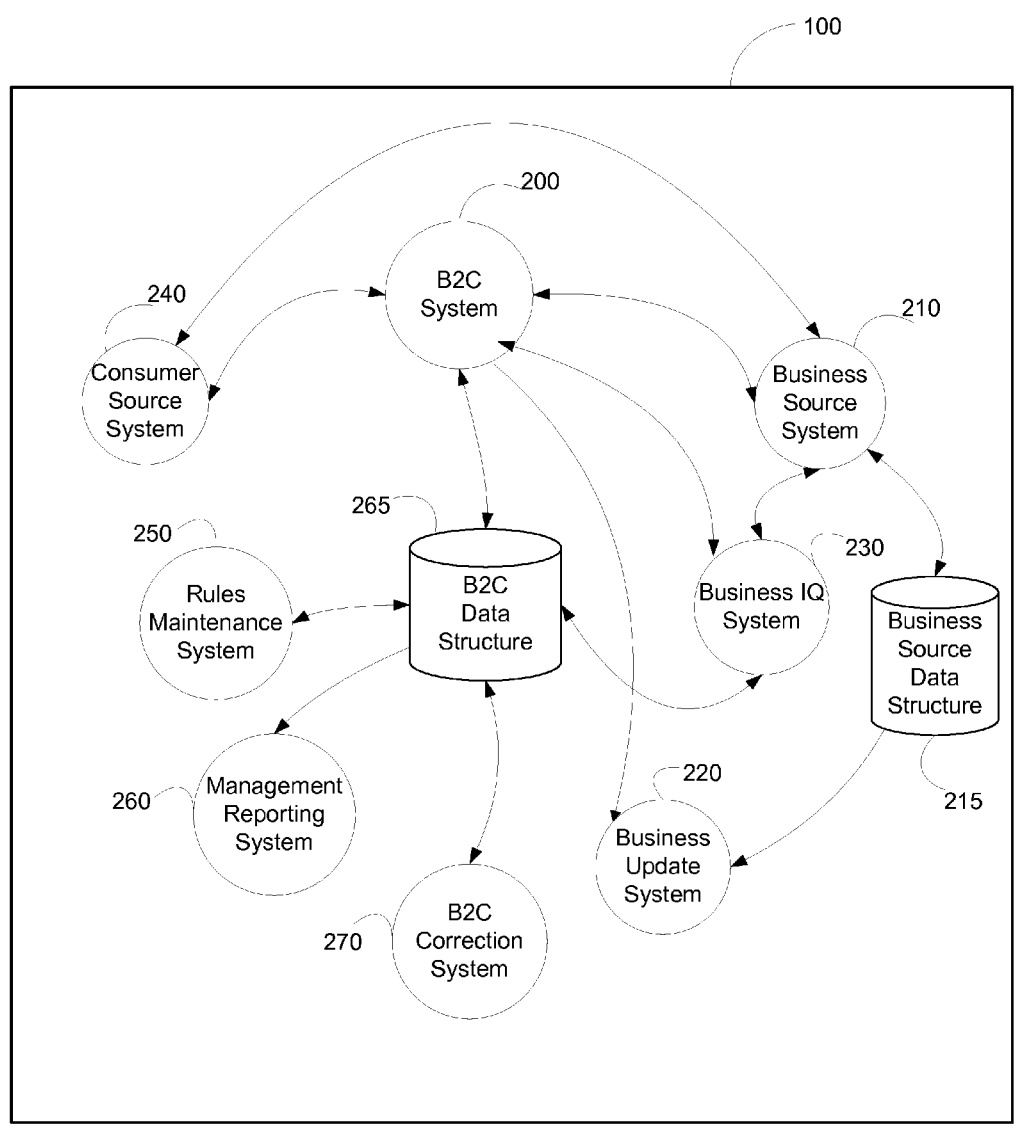
FIG. 3 is a diagram illustrating various components of a business to contact (B2C) linkage system, and their interactions, in accordance with one embodiment.

FIG. 3 is a diagram showing various components of a business to contact (B2C) linkage system 100 and their interactions, in accordance with one embodiment. The B2C linkage system 100 shown includes a B2C system 200, a business source system 210, a business source data structure 215, a business update system 220, a business IQ system 230, a consumer source system 240, a rules maintenance system 250, a management reporting system 260, a B2C correction system 270 and a B2C data structure 265.

The B2C system 200 may be referred to as the system of reference for products or requesting entities that need to access links between contacts and businesses. The B2C system 200 stores and maintains a list of PIN-BIN links. In one embodiment, the list is maintained in an entity relationship table. The business source system 210 may be referred to as the system of record that stores and maintains reported business-contact links, and is used as the source of data to establish and maintain PIN-BIN links in the B2C system 200. In some embodiments, the business source system 210 includes a search engine to identify a contact that is reported as associated to a business.

The business update system 220 may be responsible for applying manual updates to business related information in the business source data structure 215. The business update system 220 may also have a criteria-based selection and review function to support the manual correction process. The business update system 220 may include contact correction and/or manual update functionality to allow administrators of the B2C Linkage system 100 to delete, add, or change contact information. The business update system 220 may also allow administrators to be able to view existing data before and after applying corrections.

The business IQ system 230 provides an integrated portal to allow requesting entities to access products and services, including products regarding the business-to-contact (B2C) links. The business IQ system 230 may in some embodiments allow the requesting entity to request B2C links and view the results through the integrated customer portal. The consumer source system 240 may be used to build and maintain the PIN-BIN links in the B2C system 200 by identifying contacts reported as business contacts. The consumer source system 240 may include a consumer search engine (not shown) to identify the contacts.

The rules maintenance system 250 stores and maintains business rules used by the B2C linkage system 100. The business rules may include rules for PIN-BIN link usage, as well as rules for PIN-BIN link quality derivation. In some embodiments, the rules maintenance system 250 may include a user interface (not shown) to allow administrators of the B2C linkage system 100 to establish and maintain the business rules used by the system. The Rules Maintenance System 250 may store and maintain link usage rules and link quality rules. The link usage rules and the link quality rules may be based on various business rules as determined by the administrators of the B2C linkage system 100.

The management reporting system 260 is used to generate link usage reports on a periodic basis. Similar to the rules maintenance system 250, the management reporting system 260 may also include a user interface (not shown) to allow administrators of the B2C Link Module system 150 to specify and generate management reports. The B2C correction system 270 may be responsible for applying corrections and manual updates to PIN-BIN links. The B2C correction system 270 may allow the application of manual updates to the data in the B2C data structure 265. The manual update functionality may allow administrators of the B2C Linkage system 100 to delete PIN-BIN links or to update attributes of existing PIN-BIN links. Through the B2C Correction System 270, the administrators of the B2C Linkage system 100 may also be able to view onfile data before and after applying corrections.

The B2C data structure 265 stores various types of information used by the systems of the B2C linkage system 100. The B2C data structure 265 may include all PIN-BIN links, with an indication associated with each link representing whether the link is active/valid or inactive/invalid. The links may also include a link quality score, which is a derived score to denote the quality of the link. The quality of the link may, in some embodiments, be an indication of the likelihood that the linked business and individual truly do have an association (either current or past). The derivation of the link quality score may be based on several factors, including for example who reported the business to contact relationship, the reliability of the reporter, the number of times the business to contact relationship was reported, and the like. Some other factors which may affect the usage of a link, and which may be stored in the B2C data structure 265 include: the type of relationship between the contact identified by the PIN and the business identified by the BIN; the legal structure of the business (for example, whether the business is a corporation, a partnership, a sole proprietorship, etc); the dates the relationship between the contact and the business was first and last reported; whether the relationship between the contact and the business is actively reported by at least one public record source, and the like.

The B2C data structure 265 may also store, in the transaction that reported the PIN-BIN link, information pointing to the actual business name and address in a data structure of business information, as well as pointing to the actual contact name and address in a data structure of consumer information. The information pointed may be stored in the business source data structure 215 and/or the consumer source system 240. The B2C data structure 265 may also store historical snapshots of the PIN-BIN link information at various points in time. The B2C data structure 265 may also store audit information about a correction and/or manual update to a PIN-BIN link. The B2C data structure 265 may also store an audit trail of links that were requested, and an associated link usage rules table to determine whether or not to deliver a requested link.

The various components of the B2C linkage system 100 interact with each other in various ways. For example, business to contact links may be extracted from the business source data structure 215 by the business source system 210 and sent to the B2C system 200. The B2C system 200 may then use this information to establish and maintain PIN-BIN links. Similarly, supporting information about the PIN-BIN links in the B2C data structure 265 may be extracted from the business source data structure 215 by the business source system 210 and sent to the B2C system 200. The B2C system 200 may then use this information to evaluate the quality of the PIN-BIN links in the B2C data structure 265.

The business source system 210 and the B2C system 200 may also interact when the business source system 210 merges two or more BINs together, or splits a BIN into two or more BINs, and passes this merge or split information to the B2C system 200. The B2C system 200 may then update the merge information in the B2C data structure 265, and identify potentially invalid BINS due to the splits. When a B2C link is requested by a client, the business source system 210 may determine the businesses that are linked to a contact by generating a request to the B2C system 200 containing the PIN that identifies the contact. The business source system 210 then receives from the B2C system 200 the BINs that are linked to the PIN as stored in the B2C data structure 265. The business source system 210 may then use this information to assemble/display information about the businesses related to the PIN. The B2C system 200 also ensures that the PIN in the B2C data structure 265 is updated in case of PIN merges.

Similarly, when a B2C link is requested by a requesting entity, the business source system 210 determines the contacts that are linked to a business by generating a request to the B2C system 200 containing the BIN that identifies the business. The business source system 210 then receives from the B2C system 200 the PINs that are linked to the BIN as stored in the B2C data structure 265. The business source system 210 may then use this information to assemble/display information about the contacts related to the BIN.

The PIN-BIN link stored in the B2C data structure 265 may no longer be valid if the BIN is split into multiple BINs in the business source data structure 215 or if the PIN is split into multiple PINs in the consumer source system 240. The business source system 210 informs the B2C system 200 of BIN splits. The consumer source system 240 may likewise inform the B2C system 200 of PIN splits. When a PIN-BIN link is identified as potentially invalid, the B2C system 200 will generate a B2C link request to the business source system 210. The business source system 210 may then resend B2C Link candidates related to the potentially invalid PIN-BIN link. These transactions enable the B2C system to derive and store the PIN-BIN link that represents the current PIN and the current BIN.

The B2C system 200 submits PIN requests as part of processing B2C Link candidates from the business source system 210. A PIN Request contains the contact identification information. The B2C system 200 receives the PIN in a response from the consumer source system 240. The response contains the PIN that the consumer source system 240 identified based on the contact identification information in the request. The response is used by the B2C system 200 to establish PIN-BIN links in the B2C data structure 265.

Another type of data flow from the B2C system 200 to the consumer source system 240 may be as follows. In consumer source system 240, PINs are sometimes merged together with one of the PINs selected as the surviving PIN; the rest of the PINs in the merged set then become obsolete. The B2C system 200 ensures that the PINs stored in the B2C data structure 265 are updated with the survivor PIN in case of a merge situation. To accomplish this, the B2C system 200 may periodically send a file of PINs to consumer source system 240 and consumer source system 240 may send the new survivor PIN when the PIN has been merged.

In some embodiments, the B2C system 200 may generate a list of B2C links for manual review. The B2C system 200 may have a process to periodically assess links, check for contradictory information, detect suspicious links, and the like. Based on business rules, the B2C system 200 may identify links that should be reviewed manually and send them to the business update system 220.

In some embodiments, when a Business IQ system 230 requesting entity requests to view the businesses related to a business contact, Business IQ system 230 may generate a request to the B2C system 200 containing the PIN that identifies the contact. Business source system 210 may then receive the BINs that are linked to the PIN as stored in the B2C data structure 265. These BINs may then be used by Business IQ system 230 to display information about the businesses related to the PIN.

When a business IQ system 230 requesting entity requests to view the business contacts related to a business, the business IQ system 230 generates a request to the B2C system 200 containing the BIN that identifies the business. Business IQ system 230 receives the PINs that are linked to the BIN as stored in the B2C data structure 265. The results may be used by Business IQ system 230 to display information about the contacts related to the BIN.

In some embodiments, the business source system 210 may submit a individual identification request containing the contact identification information or the PIN. In response, the consumer source system 240 may return the PIN with the best identification attributes (name, address, phone, etc.) that consumer source system 240 has for the contact inquired upon.

There may be several data suppliers or contributors that report B2C links in conjunction with the primary data regarding businesses and or contacts being reported. For example, a purpose of trade files from trade contributors may be to report account level information. However, trade contributors can also report the owners, guarantors, executives and other individuals that are contacts of the business that owns the account. Business source system 210 may store B2C links from the data suppliers or contributors in addition to any new supplier files that business source system 210 processes.

Figure 4:
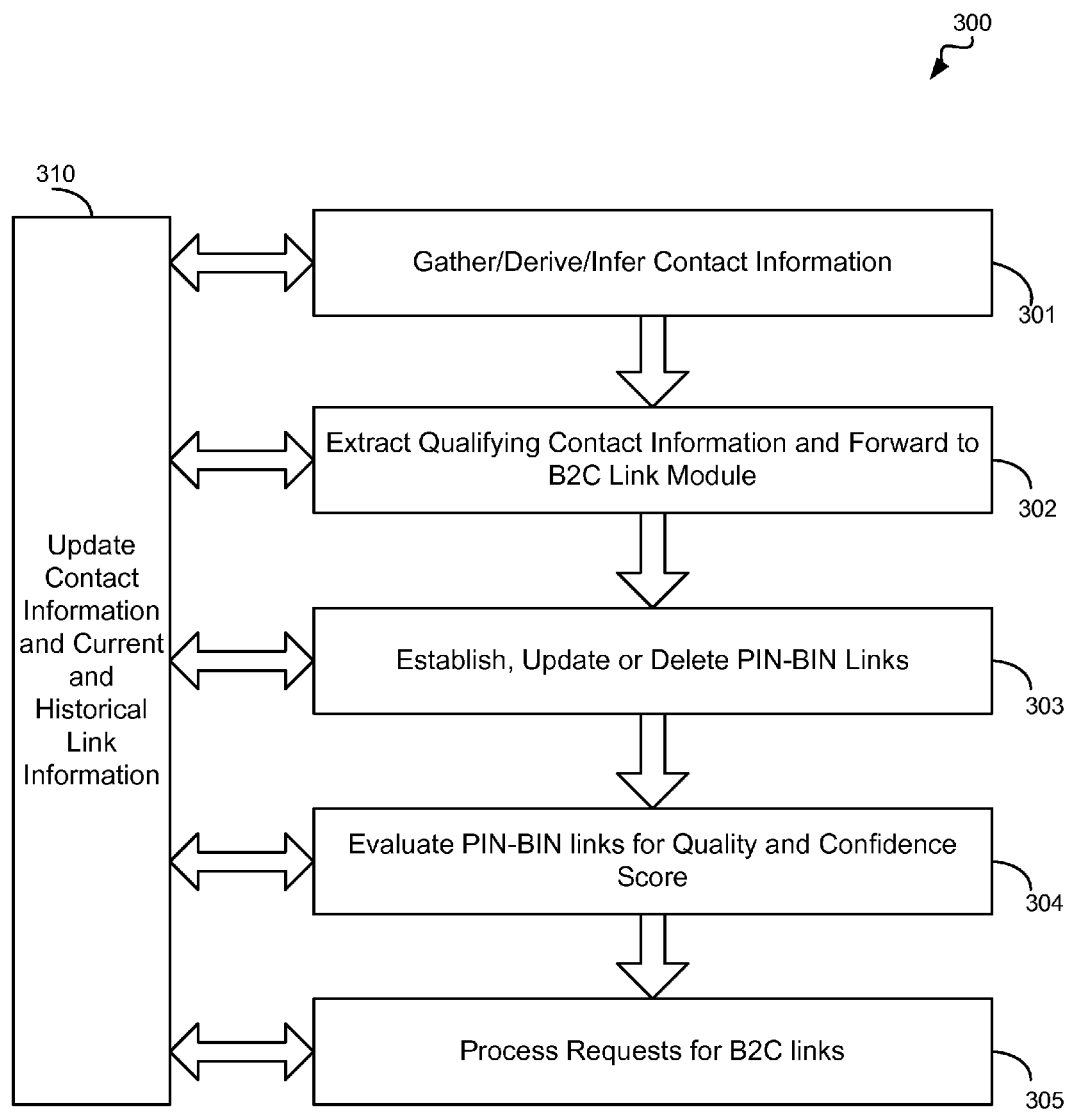
FIG. 4 is a flowchart showing operational flow of the B2C linkage system in accordance with one embodiment.

FIG. 4 is a flowchart showing operational flow of the B2C linkage system in accordance with one embodiment. Depending on the embodiment, the method of FIG. 4 may include fewer or additional blocks and/or the blocks may be performed in a different order than is illustrated. For ease of explanation, the method will be described herein as performed by the computing system 100 and, more specifically, by various modules executing on system 100; however, the method may be performed by any other suitable computing devices.

In block 301, the B2C linkage system 100 may gather contact information. The contact information may be gathered from various contributors, such as vendors, public record sources, administrators and other users of the B2C linkage system. In some embodiments, the contact information may be stored in a data structure of files on credit-active individuals, such as for example a data structure in consumer source system 240. The contact information gathered may be validated before storage in the consumer source system 240. In various embodiments, the validation may include a verification of the information with a second source, internal or external. In some embodiments, contact information may also be derived or inferred based on gathered information.

Next, at block 302, qualifying contact information is extracted from the business source data structure 215, where business information associated with a contact is assigned a business identification number (BIN). Qualifying contact information may include business information associated with the business contact, such as the BIN. The BIN extracted may then be forwarded to the B2C Link Module 150 for possible matching of the BIN to a PIN in the consumer source system 240. The matching may be based on an identification of the individual designated by the PIN also being a principal, e.g., of a given business with an associated BIN. In some embodiments, the matching may be enabled by a search engine in the consumer source system 240. When the B2C Link Module 150 finds a matching PIN to the contact information received, a link may be established, updated or deleted in the PIN-BIN links stored on the B2C data structure 265 at block 303. In various embodiments, the links may be established, updated or deleted by applying certain rules of construction. The rules of construction may be based on, for example, a substantiated link, a legitimate goal, clear meaning, contradictory evidence, right to capture, right to use, and the like.

For example, a link can be established or altered only when sufficient intent exists to justify the creation or alteration. A sufficient intent may be that there was information regarding the link between the individual and the business identified obtained from a public record source, or that information obtained from contributed sources was corroborated by public record sources, or that the information was inferred from public record source. In some embodiments, a link can be established or altered if there is a clear or unambiguous continuous line of sight that reasonably demonstrates the sufficient intent under which the link was created, the justification for the continued existence of the link, or that maintenance has occurred with information concerning the context and circumstances of each link provided upon creation or alteration. A link may also be established, updated or deleted based on contradictory evidence, where the contradictory evidence may be assigned sufficient priority such that it serves to diminish the quality of a link, or to dissolve the link. The contradictory evidence may in some instances consist of a lack of positive reporting of activity for a given link.

Once the links are established or updated at block 303, they are evaluated for a quality and confidence score at block 304. Further details of the evaluation of the link quality and confidence score are described in reference to FIG. 5 below. In various embodiments, each link may be periodically evaluated and assigned attributes that further describe the link, its quality and/or fitness for use, including a confidence index for the link, the link type and source, and/or integrity dates and information.

Once the links are established and quality and confidence scores are assigned, the B2C linkage system 100 may receive requests for B2C links at block 305. Requests received are validated, authorized and processed according to usage rules. A usage log of the requests may also be generated and stored.

At block 310, processes to maintain the links, as well as to perform active surveillance of validity and accuracy are performed, and the links are adjusted while the method performs the process at blocks 301-305. At block 310, usage rules may be defined and maintained and an audit of all link usage may also be maintained, providing a complete view of each link and its full transactional lineage.

Figure 5:
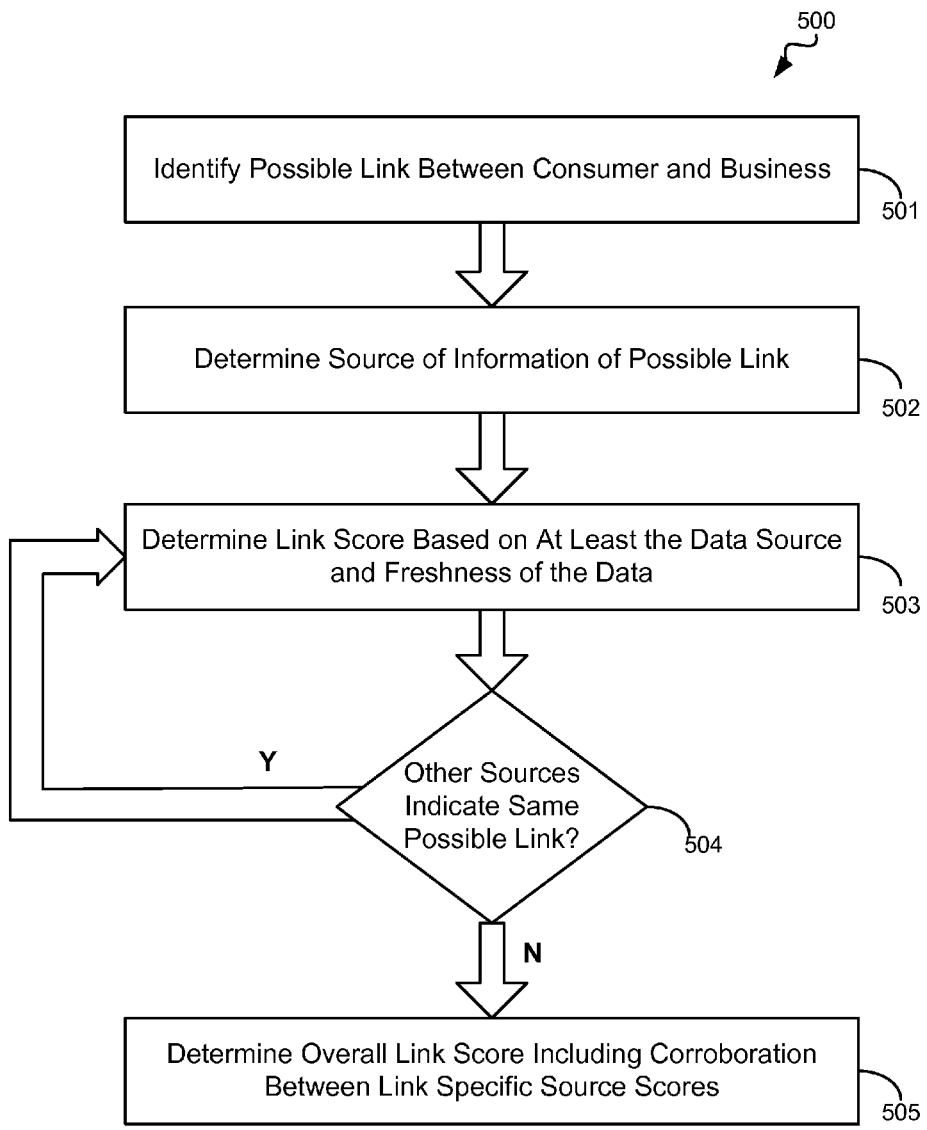
FIG. 5 is a flowchart showing a process for determining link quality in accordance with one embodiment.

FIG. 5 is a flowchart illustrating a process for determining link quality in accordance with one embodiment. This process may be performed by the B2C linkage system 100 at block 304 of FIG. 4, for example. Depending on the embodiment, the method of FIG. 5 may include fewer or additional blocks and/or the blocks may be performed in a different order than is illustrated. For ease of explanation, the method will be described herein as performed by the computing system 100 and, more specifically, by various modules executing on system 100; however, the method may be performed by any other suitable computing devices.

In block 501, the B2C linkage system 100 identifies a possible link between an individual and a business after having received information regarding an individual, such as from a requesting entity that is contemplating a relationship with the individual. For each link identified, the link quality module 155 of the B2C linkage system 100 may determine, at block 502, the source of the link information that identifies the individual as being associated with the business. As described above, the link information may have been received from one or more sources, such as sources providing information regarding corporate record filings, fictitious business name filings, business license filings, UCC filings, judgments tax liens, bankruptcies, sales tax filings, consumer credit data, and/or consumer marketing.

Once the source(s) of the possible link is determined, the link quality module 155 may determine a link score based on at least the source of the information, the freshness of the data received from the source, and other factors determined to be relevant in the business rules. In one embodiment, the link quality module 155 may not consider all information in a uniform manner. In some embodiments, information sources may have respective confidence levels that are used in developing link scores for links based on information received from the respective sources. For example, public record sources, including for example corporate registrations, fictitious business name filings, UCC filings, sales tax filings, and the like, may have a higher confidence level and, thus, B2C links based on information from public record sources may have higher scores than links based on information from other, lower confidence level sources, such as information gathered at a trade show linking an individual to a business. Furthermore, individual public record sources, such as those noted above, may have separate confidence levels, such that B2C links identified by those sources are assigned link qualities based on the respective confidence level of the particular public record source.

In some embodiments, if the recency of data received from a given source exceeds a configurable threshold of time (e.g., set by the requesting entity and/or the provider of the B2C linkage system 100), then that B2C link may be assigned a lower score than a link identified in data that has been received more recently and does not exceed the configurable threshold. In some embodiments, the data received from a given source may be assigned an expiration time after which the data may be completely disregarded, or given a link quality score of zero, for example. This step may be repeated for each source identified, as indicated by block 504.

In one embodiment, the data sources are periodically accessed in order to retrieve new information in which possible business to contact links may be identified. For example, the provider of the B2C linkage system 100 may have a relationship with various data sources, such that periodic updates to the data sources are provided to the B2C linkage system 100 either in a push or pull architecture. For example, some data sources may be configured to automatically provide updated information to the B2C linkage system 100 on a periodic basis, such as daily, weekly, monthly, etc., while other data sources are accessed by the B2C linkage system 100 periodically in order to identify and/or retrieve data indicative of possible B2C links. In one embodiment, one or more of the data sources are queried in real-time in response to a request for B2C links of a particular individual from a requesting entity. In this embodiment, the most updated data regarding the B2C links of the individual may be identified and conveyed to the requesting entity.

Then, at block 505, an overall link score may be determined based on the individual source scores and an adjustment for corroborating sources. For example, if information regarding a particular B2C link is not available from a public records source, but it is available from multiple non-public record source, then link score may be adjusted upward to account for the corroboration of the multiple sources. Similarly, if the same B2C link is identified by a public record source and a non-public record source, then the link quality score may be adjusted upward based on corroboration from the public record source, and the link quality score may be available for subsequent searches.

Figure 6:
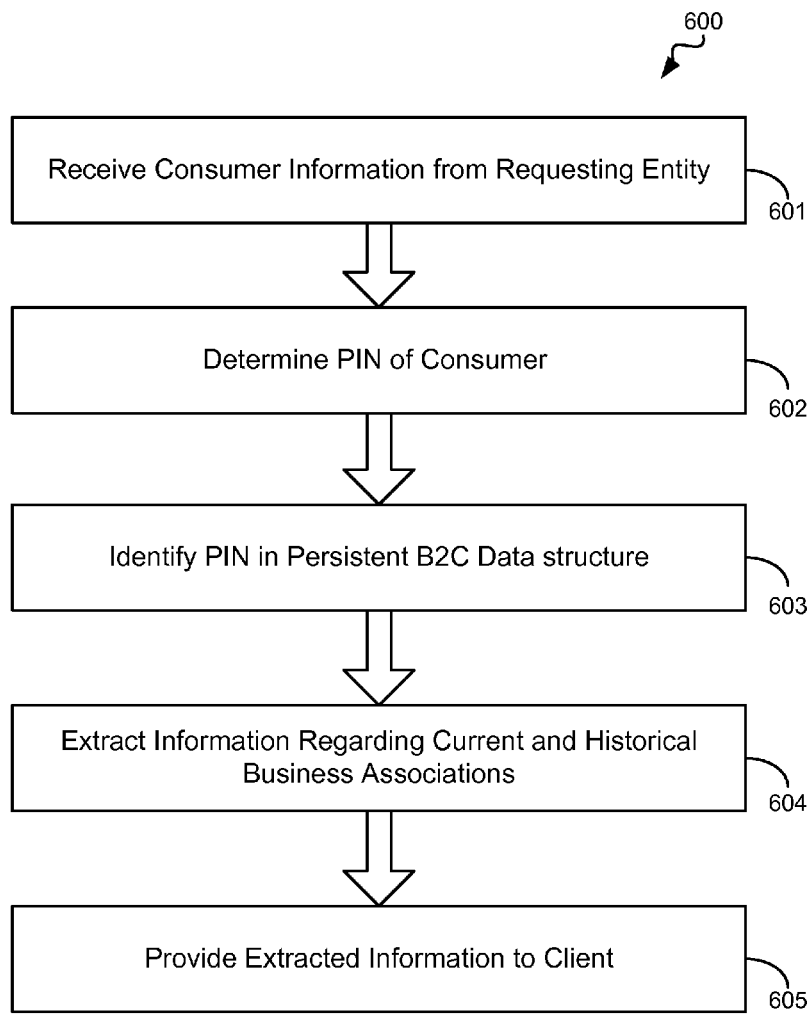
FIG. 6 is a flowchart showing a process for providing a response to a request from a requesting entity in accordance with one embodiment.

FIG. 6 is a flowchart showing a process for providing a response to a request from a requesting entity in accordance with one embodiment. Depending on the embodiment, the method of FIG. 6 may include fewer or additional blocks and/or the blocks may be performed in a different order than is illustrated. For ease of explanation, the method will be described herein as performed by the computing system 100 and, more specifically, by various modules executing on system 100; however, the method may be performed by any other suitable computing devices.

In block 601, the B2C linkage system 100 may receive individual information from a requesting entity using the B2C linkage system. In various embodiments, the requesting entity may be a financial service provider wishing to extend credit services to individuals and businesses. In its investigation associated with such transactions, the financial service provider may wish to receive financial data related to credit activities, current assets, and current liabilities of the individual, as well as the financial health of the businesses associated with the individual. The individual information received from the requesting entity may include a individual's name. In some embodiments, the individual's address may also be provided. In other embodiments, more information regarding the individual may optionally be provided by the requesting entity. In various embodiments, the information and request by the requesting entity may be provided through a user interface of a browser or standalone software that is in communication with the B2C linkage system 100.

Next, at block 602, the B2C linkage system 200 may determine the PIN of the individual. As explained above, in some embodiments, the PINs associated with various individuals may be stored in the consumer source system 240.

Next at block 603, the PIN is searched in the persistent B2C data structure. As described above, the B2C data structure 265 may store information regarding links between individuals and businesses, such as by establishing PIN-BIN links between the individuals and businesses. The information regarding the individuals may be stored in the consumer source system 240, and the information regarding the respective businesses may be stored in the business source system 210. For each occurrence of the PIN-BIN link in the B2C data structure 265, information regarding the business associated with the BIN may be obtained from the business source system 210. For example, the B2C data structure 265 may not include details regarding each of the businesses associated with a PIN-BIN link. However, the details of a business may be retrieved from business source system 210 by requesting information regarding a particular BIN of interest. With this configuration of data sources, the business information is not exposed simply by accessing the B2C data structure 265; rather, the business information is maintained in the business source system 210 and is separately accessed once a BIN of interest is identified in the B2C data structure 265.

Some of the BINs associated with a particular individual (e.g., BINs associated with a particular PIN) may be associated with businesses that are no longer operational (e.g., gone out of business, filed bankruptcy, merged with another business, etc.). Thus, the BINs associated with a particular individual may include any number of currently active businesses and/or inactive businesses. The PIN-BIN links, as well as the audit information about a correction and/or manual update to a PIN-BIN link may be available in the B2C data structure 265.

Once the current and historical PIN-BIN links are identified, then at block 605, part or all of the identified links between businesses and the particular individual may be provided to the requesting entity, such as in a user interface similar to that of FIG. 7. In some embodiments, the process illustrated in FIG. 6 may occur in real-time. In some embodiments, the B2C linkage system 100 may apply link usage rules to determine whether or not to deliver a requested link. For example, in some embodiments, links with scores above a certain threshold may be returned to the requesting entity. The threshold may be configurable by the administrator of the system or by the requesting entity.

FIG. 7 is a sample report showing current and historical businesses associated with an individual according to some embodiments. In various embodiments, the reports may include identifying information 700 of an individual and the individual's current and previous businesses 710. Although not shown, up to five of the owner or principal's most recent addresses may also be shown, as well as other individual identification data useful to assist the requesting entity in identifying jurisdictions that may contain information on the individual.

The report may also include the strength threshold for each link 711 between a business (e.g., a particular BIN) and the individual. The report may also in include the individual's title with each of the identified businesses. In some embodiments, links displayed to the requesting entity may only be the subset of links identified which have link quality scores above a configurable threshold. The threshold may be configured by the administrator of the B2C linkage system 100, or by the requesting entity. For example, the thresholds for link scores may be numbers between 0-100, or 0-10, a range similar to credit score ranges (e.g., 340-840), or any other range. In some embodiments, the link quality scores are not provided to the requesting entity, but the links are filtered to include only those having a minimum link quality score. In other embodiments, the actual link quality scores are provided to the requesting entity. In other embodiments, the link quality scores are generalized into groups, such as high, medium, and low confidence levels that are provided to the requesting entity.

In some embodiments, the B2C links may be used to deliver a business owner profile, which may identify the current and previous businesses and individual business partners with whom a small business owner has been associated. In addition, alerts can be generated as the business owner or their business affiliates appear on governmental watch lists and fraud alerts. An expanded version of the report can be provided that includes the business owner's consumer credit report in addition to their affiliation information. This type of product can help a requesting entity with authentication and fraud detection, commercial collections, insurance claims and even tax collection activities.

In some other embodiments, the B2C linkage system may allow requesting entities to receive blended reports without having to input individual information on the owners. A blended report may include the consumer credit report of the individual and the business score associated with the business associated with the individual, as indicated by the requesting entity. These types of reports can automatically be generated by requesting entities ordering a commercial report for a given business. Requesting entities can opt to receive a blended report whenever a linkage to the business owner is present as their default setting or can be prompted at the point of sale before receiving the blended information.

Another type of report may provide requesting entities with the ability to view the name, address and summary trade data of businesses that are linked to a business they inquire upon through common ownership.

The B2C linkage system may also deliver a product which provides linkage information in a batch environment to enable businesses to quickly identify:

Undisclosed business interests to understand the global business liabilities associated with a business owner;

Individuals that are currently a customer or have been a customer in the past under a different business identity;

Relationships between a business owner and other business associates to identify potential fraud;

Businesses that have moved to a new operating location for commercial collection purposes;

The performance of businesses during a business owner's affiliation with them to identify potential bust out fraud risks.

FIG. 8 shows a sample report showing some commercial credit metrics for a current business linked to an individual. Some key metrics may include the sum of current balance 810 and recent high credit 820 to show current and potential exposure of the business. In some embodiments, a commercial risk score 830 may also be provided for current business affiliations, as well as an indication of the average days beyond terms (DBT) 840 to illustrate the payment performance of each businesses under management

SUMMARY

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by an Information Display Computing Device and/or any other suitable computing device. The methods may be executed on the computing devices in response to execution of software instructions or other executable code read from a tangible computer readable medium. A tangible computer readable medium is a data storage device that can store data that is readable by a computing system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method comprising
receiving, from a credit-extending entity, a request for information regarding business associations of an individual;
determining a unique personal identification number of the individual;
providing a data structure having a plurality of personal identification numbers and associations between respective personal identification numbers and businesses,
locating, by a computing system having one or more hardware processors, occurrences of the personal identification number in the data structure;
for each occurrence of the personal identification number, extracting, by the computing system, business information regarding the business associated with the personal identification number;
determining, by the computing system, a confidence score for each business associated with the personal identification number, wherein each confidence score is determined based on identities of one or more sources of the business information, a reliability associated with each of the one or more sources, or a quantity of the one or more sources, the business information including information indicating relationship between the individual and the business, the confidence scores indicating respective levels of confidence that the individual was and/or is a principal of businesses;
determining, by the computing system, one or more of the businesses associated with the personal identification number having confidence scores above a threshold; and
generating a user interface including business information regarding the determined one or more businesses, the user interface including indicators of the confidence scores for respective of the one or more businesses; and
providing the user interface to the credit-extending entity.

2. The method of claim 1, further comprising receiving a request from a requesting entity for information regarding B2C links and generating a report for the requesting entity related to the B2C links.

3. The method of claim 1, wherein the information regarding the business associations of the individual is relevant to a determination of whether to extend credit to the individual and/or one or more associated businesses.

4. The method of claim 1, wherein the business information regarding the determined one or more businesses comprises one or more of a consumer credit report of the individual or one or more business scores associated with respective businesses associated with the individual.

5. A method for linking individuals to business entities having the individual as a common business owner, the method comprising:
gathering records regarding individuals from a variety of consumer information sources, wherein a record associated with an individual is identified by a personal identification number (PIN);
gathering records regarding businesses from a variety of business information sources, wherein a record associated with a business is identified by an owner and a business identification number (BIN);
establishing links between records of the individual identified by the PIN and a record of at least one business associated with a BIN based on data from one or more of a variety of sources;
evaluating, by a computing system having one or more processors, a quality associated with each link, wherein evaluating the quality comprises:
for each of the variety of sources:
determining a partial link score indicating a confidence level that the individual has had a fiduciary duty to the business, wherein the partial link score is determined based on at least one of: identities of one or more of the variety of sources, a reliability associated with each of the one or more of the variety of sources, or a quantity of the one or more of the variety of sources; and
determining an overall link score based on the partial link scores for the variety of sources, the overall link score indicating an overall confidence level that the individual has had a fiduciary duty to the business.

6. The method of claim 5, further comprising reconciling duplicate records associated by a common BIN.

7. The method of claim 6, wherein reconciling duplicate records comprises flagging one or more of the duplicate records.

8. The method of claim 5, wherein establishing possible links comprises matching the PIN with the owner identified in the business record.

9. The method of claim 5, wherein determining a partial link score is based on a type of the link source.

10. The method of claim 9, wherein a type of the link source includes at least one of: corporate record filings data structure, fictitious business name filings data structure, business license filings data structure, UCC filings data structure, judgments data structure, tax liens data structure, bankruptcies data structure, sales tax filings data structure.

11. The method of claim 5, wherein determining a partial link score is based on freshness of information from the link source.

12. The method of claim 5, wherein the consumer information sources include at least one of a consumer credit data structure and a consumer marketing data structure.

13. The method of claim 5, wherein the business information sources include at least one of: corporate record filings data structure, fictitious business name filings data structure, business license filings data structure, UCC filings data structure, judgments data structure, tax liens data structure, bankruptcies data structure, sales tax filings data structure.

14. A computing system comprising:
one or more computer processors;
one or more computer storage devices configured to store instructions that are executable by the one or more computer processors, the instructions including at least:
a consumer data structure comprising a plurality of individual records, wherein the individual records comprise a personal identifying field;
a business data structure comprising a plurality of business records, wherein the business records comprise an owner identity, and a business identifying field;
a multiple-business filter configured to access the business data structure and select a subset of the plurality of business records, wherein the subset comprises business records having the owner identity associated with the personal identifying field of an individual record, wherein at least one association between the owner identity and the personal identifying field is a historical association;
a business to individual link module configured to establish a link between the subset of plurality of business records and the individual record;
a link quality module configured to evaluate the quality of the link established by the business to individual link module, wherein the quality of the link is evaluated based on one or more of identities of one or more sources indicating the link, a reliability associated with each of the one or more of sources, or a quantity of the one or more sources.

15. The computing system of claim 14, the instructions further including a multiple-business owner link data structure configured to store the subset identified by the multiple-business filter.

16. The computing system of claim 14, the instructions further including a false-positive filter configured to access the subset and identify multiple-business owner records, wherein the multiple-business owner records are identified based at least in part on the business identifying field.

17. The computing system of claim 14, the instructions further including a link quality module configured to evaluate the quality of the link established by the business to individual link module.

18. The computing system of claim 17, the instructions further including a client interfacing module configured to receive a request from a requesting entity for information regarding business to individual links and generating a report for the requesting entity related to the business to individual links.

19. The computing system of claim 18, wherein the report comprises an indication of the quality of each link.

20. A non-transitory computer-readable medium which stores executable instructions configured for execution by a computing system having one or more computer processors in order to:
access records regarding individuals from a variety of consumer information sources, wherein a record associated with an individual is identified by a personal identification number (PIN);
access records regarding businesses from a variety of business information sources, wherein a record associated with a business is identified by an owner and a business identification number (BIN);
establish links between a record of an individual identified by a PIN and a record of at least one business associated with a BIN based on a determination that an owner associated with the at least one business is the same as the individual identified;
evaluate a quality associated with each link by, for each link:
determining a source for the link;
determining a partial link score indicating a confidence level that the individual has had a fiduciary duty to the business, wherein the partial link score is determined based on at least identities of one or more of the variety of sources, a reliability associated with each of the one or more of the variety of sources, or a quantity of the one or more of the variety of sources; and determining an overall link score based on the partial link scores for the established links, the overall link score indicating an overall confidence level that the individual has had a fiduciary duty to the business.

\* \* \* \* \*